April 12, 1955     K. BOYER     2,706,274
AMPLITUDE AND PHASE INDICATOR CIRCUIT
Filed March 24, 1952
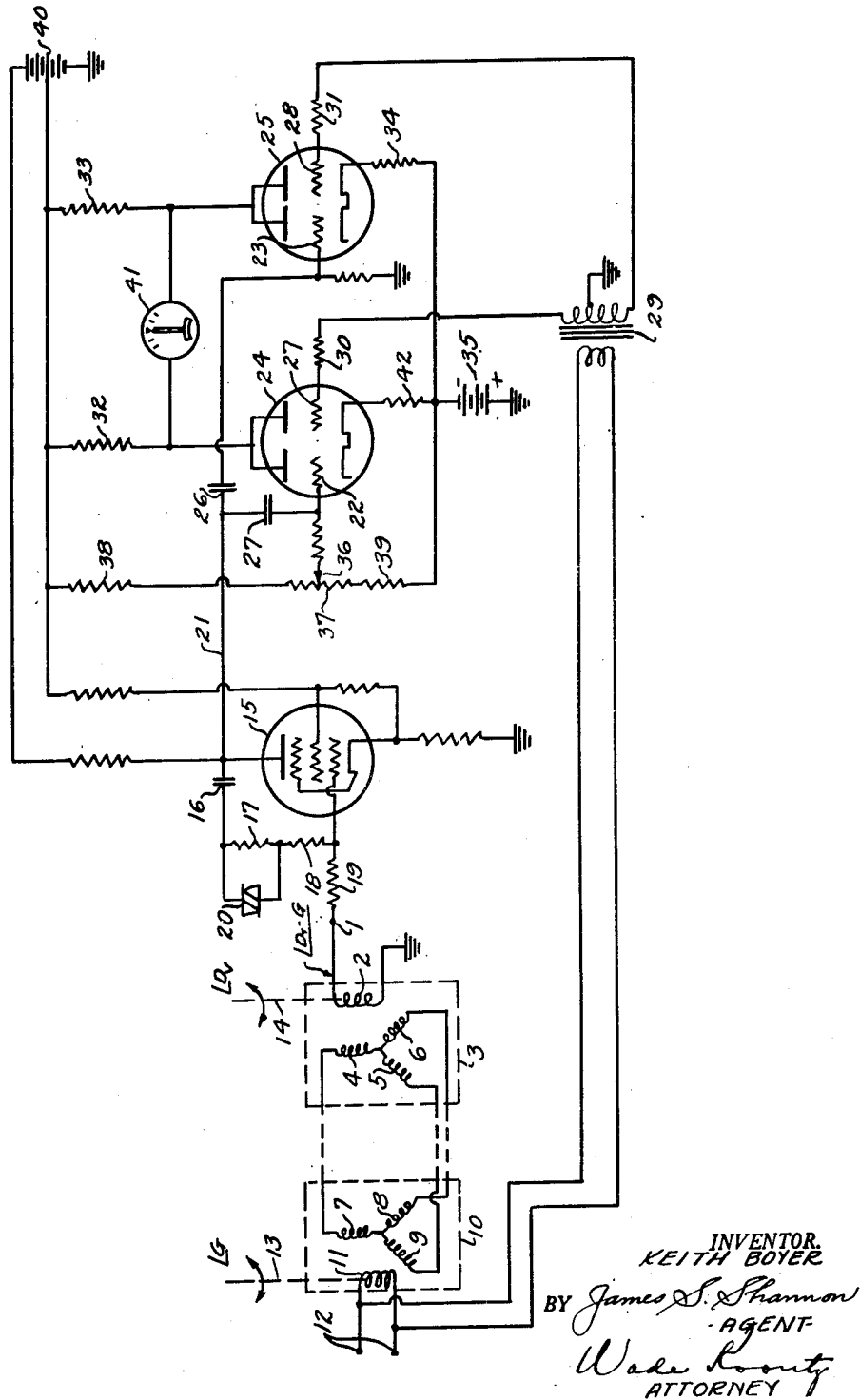
INVENTOR.
KEITH BOYER
BY James S. Shannon
AGENT
Wade Koontz
ATTORNEY

# 2,706,274

AMPLITUDE AND PHASE INDICATOR CIRCUIT

Keith Boyer, Los Alamos, N. Mex., assignor, by mesne assignments, to the United States of America as represented by the Secretary of the Air Force Application March 24, 1952, Serial No. 278,257

4 Claims. (Cl. 324—83)

This invention relates specifically to a circuit for indicating the difference between two angles. It is intended primarily to be used in airplane navigational equipment to indicate the difference between the actual heading of the airplane and the desired heading, as determined by navigational apparatus on the airplane, so as to provide visual steering information to the pilot or electrical steering information to automatic flight control equipment.

The indicator circuit is designed for use with an alternating current error signal having an amplitude indicative of the amount of the angular difference and two possible phases, 180° apart, indicative of the sense of the angular difference. Therefore, the indicator circuit is fundamentally a device for indicating the amplitude and phase of an alternating current signal of the above type, and as such may be used wherever such an indication is called for.

The details of the indicator circuit will be explained in connection with the accompanying drawing which shows a schematic diagram of the circuit.

Referring to the drawing, the error signal is applied to input terminal 1 of the indicator circuit. As already explained this error signal is a variable amplitude alternating current having two possible phases 180° apart. In the specific embodiment shown the error signal represents the difference between the angle G which may be the actual heading azimuth of an airplane and the angle $D_v$ which may be the azimuth of the desired heading. The error signal is obtained from the rotor winding 2 of synchro 3, the stator windings 4, 5 and 6 of which are energized from the stator windings 7, 8 and 9 of synchro 10. The rotor winding 11 of synchro 10 is energized with constant amplitude constant frequency alternating current obtained from terminals 12. The angles G and $D_v$ are determined by navigational equipment on the airplane and the rotor windings 11 and 2 set at corresponding angular positions through shafts 13 and 14. The system is adjusted so that when $D_v=G$ the rotor winding 2 is at right angles to the flux produced by windings 4, 5 and 6 and no voltage is induced therein. A departure from equality results in a voltage in winding 2 having amplitude proportional to the angular difference and phase determined by the sense of the departure.

The error signal is applied from terminal 1 to the control grid of amplifier tube 15. The stage of amplification containing this tube has a negative feedback circuit comprising condenser 16, resistors 17, 18 and 19, and winding 2. Resistor 17 is shunted by a symmetrical nonlinear resistance device 20, such as a symmetrical "varistor," the resistance of which is inversely related to the voltage, so that the feedback increases with increasing signal amplitude. The gain of the stage therefore varies inversely with the signal amplitude thus increasing the sensitivity of the indicator circuit to weak signals.

The amplified error signal appearing on conductor 21 is applied to the grids 22 and 23 of dual triode tubes 24 and 25 through condensers 26 and 27. The grids 27 and 28 of the dual triodes have alternating voltages of opposite phases applied thereto by center tapped transformer 29, the primary winding of which is energized by the alternating voltage at terminals 12. Resistors 30 and 31 connected in series with grids 27 and 28 have a relatively high value of resistance and serve to limit grid current and the grid voltage when the grid voltage is sufficient to drive the grid positive relative to the cathode. The anode circuits of the two triode sections of tubes 24 and 25 are connected in parallel, resistor 32 acting as the common load resistor for the triode sections of tube 24 and resistor 33 acting as the common load resistor for the triode sections of tube 25. The bias potential of grids 23 and 28 of tube 25 is determined by the voltage drop across cathode resistor 34 and the voltage of direct voltage source 35. The bias of grid 27 of tube 24 is determined by the voltage drop across cathode resistor 42 and the voltage of source 35. The bias on grid 22 of tube 24 is adjustable and is determined by the position of tap 36 on resistor 37 which, together with resistors 38 and 39 form a potential divider across voltage source 35 and a portion of voltage source 40 connected in series.

The meter 41 is connected between the anodes of tube 24 and the anodes of tube 25. This is a direct current meter having its zero position in the center of the scale.

The operation of the indicator circuit may be illustrated by first considering the error signal applied to terminal 1 to be zero, as would be the case in the embodiment shown when $D_v=G$. In the absence of an error signal the meter 41 may be zeroed, if necessary, by adjusting contact 36 to equalize the anode potentials of tubes 24 and 25 so that no direct voltage appears across the meter. Under this condition there is an alternating voltage developed across meter 41 due to the equal and oppositely phased voltages on grids 27 and 28, but this voltage produces no indication on meter 41 which registers direct current only. Furthermore, when the grid 27 is positive, enough current flows through the right-hand triode of tube 24 and through common cathode resistor 42 to cut off the left hand triode of tube 24 and render it nonresponsive to a signal on its grid. Similarly, a positive voltage on grid 28 results in sufficient current flow through common cathode resistor 34 to cut off the left-hand triode section of tube 25 and render it nonresponsive to a signal on its grid. On the other hand, when grid 27 or 28 is sufficiently negative its triode section is cut off and contributes nothing to the current flow through common cathode resistor 42 or 34 thus permitting the other triode in the same envelope to conduct normally. The amplitude of the alternating voltage on grids 27 and 28 is high enough that the above conditions exist for the greater parts of the positive and negative half-cycles.

The presence of an error signal on grids 22 and 23 results in unequal half-cycles of alternating current flow through meter 41, or, in other words, produces a direct component of current through the meter. For example, assume that the error signal on grids 22 and 23 is positive and that the voltages on grids 27 and 28 are negative and positive, respectively. Under this condition the right-hand triode of tube 25 has maximum conduction, the anodes of this tube have their lowest potential and the left-hand triode is inoperative. In tube 24 the right-hand triode is cut off by the negative voltage on grid 27 and as a result the left-hand triode is normally operative. However, the positive error signal on grid 22 causes the anodes of tube 24 to have a lower potential than they would have had in the absence of an error signal. Accordingly, the flow of alternating current from the anodes of tube 24 to the anodes of tube 25 during this half cycle is less than it would have been in the absence of an error signal. This is equivalent to a flow of direct current in the opposite direction from the anodes of tube 25 to the anodes of tube 24 during this half cycle.

During the next half cycle grid 27 is positive, grid 28 is negative and grids 22 and 23 are negative. Under this condition the anodes of tube 24 have their lowest potential, the left-hand triode of tube 24 is inoperative, the right-hand triode of tube 25 is cut off and the left-hand triode of tube 25 is normally operative. However, due to the presence of the negative error signal on grid 23 the anodes of tube 25 have a higher potential than they would have had in the absence of an error signal. Accordingly, the flow of alternating current during this half cycle from the anodes of tube 25 to the anodes of tube 24 is greater than it would have been in the absence of an error signal. This also is equivalent to a flow of direct current from the anodes of tube 25 to the anodes of tube 24. Therefore when the error and reference voltages have the same phase in tube 25 and opposite phases in tube 24 a direct current component is generated which flows through the meter from tube 25 to tube 24. The amplitude of this component is proportional to the amplitude of the error signal on grids 22 and 23.

If the error signal reverses in phase, as would occur in the embodiment shown when the difference $D_v-G$ decreases to zero and then increases in the opposite sense, the phase relations existing in tubes 24 and 25 in the above example would be interchanged. The operation of the circuit under this condition would be identical to that described above except that the direct current component would now flow in the opposite direction or from tube 24 to tube 25 causing the meter to deflect to the other side of zero.

I claim:

1. A circuit for indicating the magnitude and sense of the difference between two quantities; said circuit comprising a source of alternating reference voltage of constant amplitude and phase; means for deriving from said reference voltage an error signal of the same frequency as said reference voltage, said error signal having an amplitude proportional to the magnitude of said difference and a phase the same as or opposite to that of said reference signal depending upon the sense of said difference; first, second, third and fourth vacuum tubes each having an anode, a cathode and a control grid; means connecting the anodes of said first and second tubes together and through a load impedance to the positive terminal of a source of direct potential; means connecting the anodes of said third and fourth tubes together and through a load impedance to the positive terminal of said source of direct potential; means connecting the cathodes of said first and second tubes together and through a cathode impedance to the negative terminal of said source of direct potential; means connecting the cathodes of said third and fourth tubes together and through a cathode impedance to the negative terminal of said source of direct potential; means for applying said error signal in the same phase between the control grid and cathode of said first and third tubes; means for applying said reference voltage in opposite phase between the control grid and cathode of said second and fourth tubes; and a center-zero type direct current meter connected between the aodes of said first and second tubes and the anodes of said third and fourth tubes.

2. Apparatus for indicating the magnitude and sense of the difference between two angles; said apparatus comprising first and second synchros each having stator and rotor windings; means for energizing the rotor winding of said first synchro with an alternating reference voltage; means connecting the stator windings of said second synchro to the stator windings of said first synchro; means for angularly positioning the rotor windings of said synchros in accordance with said two angles; first, second, third and fourth vacuum tubes each having an anode, a cathode and a control grid; means connecting the anodes of said first and second tubes together and through a load impedance to the positive terminal of a source of direct potential; means connecting the anodes of said third and fourth tubes together and through a load impedance to the positive terminal of said source of direct potential; means connecting the cathodes of said first and second tubes together and through a cathode impedance to the negative terminal of said source of direct potential; means connecting the cathodes of said third and fourth tubes together and through a cathode impedance to the negative terminal of said source of direct potential; a grid circuit connected between the control grid of said first tube and the negative terminal of said source of direct voltage and containing an adjustable source of positive bias voltage; a grid circuit connected between the grid of said third tube and a point of intermediate voltage on said source of direct voltage; means for applying the voltage induced in the rotor winding of said second synchro to the grid circuits of said first and third tubes in parallel; grid circuits connected between the grids of said second and fourth tubes and said point of intermediate voltage; means for introducing said reference voltage into the grid circuits of said second and fourth tubes in opposite phase; and a center-zero direct current meter connected between the anodes of said first and second tubes and the anodes of said third and fourth tubes.

3. Apparatus as claimed in claim 2 in which an amplifier is inserted between the rotor winding of said second synchro and the grid circuits of said first and third tubes, said amplifier having a negative feedback circuit containing a series connected varistor for producing an inverse relationship between the gain of said amplifier and the signal level therein.

4. A circuit for indicating the amplitude and phase of an alternating error signal of the type having two possible phases 180° apart, said circuit comprising first, second, third and fourth vacuum tubes each having an anode, cathode and control grid, means connecting the anodes of said first and second tubes together and through a load impedance to the positive terminal of a source of direct potential, means connecting the anodes of said third and fourth tubes together and through a load impedance to the positive terminal of said source of direct potential, means connecting the cathodes of said first and second tubes together and through a cathode impedance to the negative terminal of said source of direct potential, means connecting the cathodes of said third and fourth tubes together and through a cathode impedance to the negative terminal of said source of direct potential, means for applying said error signal between the control grid and cathode in said first and third tubes, means for generating a pair of alternating reference voltages having the same frequency as said error signal and fixed phases that are 180° apart and always either in phase with or 180° out-of-phase with said error signal, means for applying one of said reference voltages between the grid and cathode of said second tube and the other of said reference voltages between the grid and cathode of said fourth tube, and a center-zero direct current meter connected between the anodes of said first and second tubes and the anodes of said third and fourth tubes.

No references cited.